Feb. 8, 1944. R. E. BRIGGS 2,341,356
METHOD OF ELECTROLYTIC PRECIPITATION OF DISSOLVED
SUBSTANCES FROM SOLUTIONS
Filed May 24, 1940
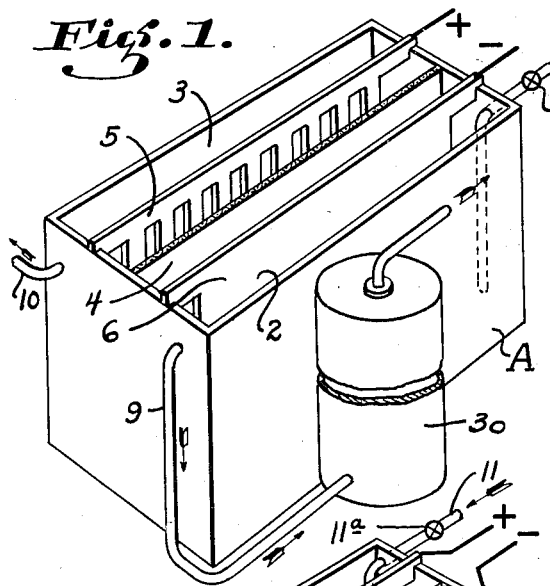
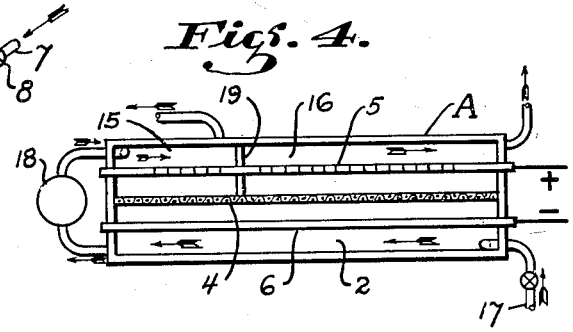
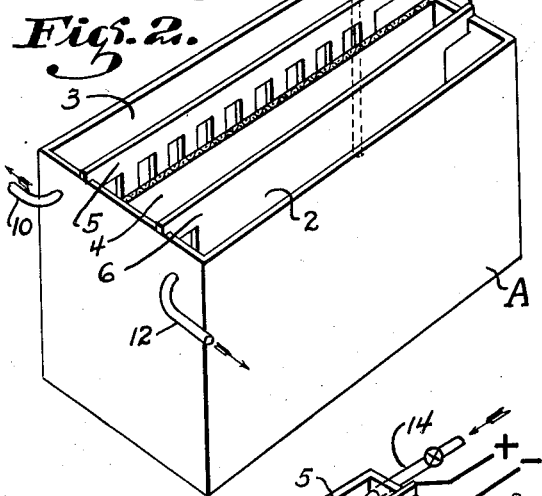
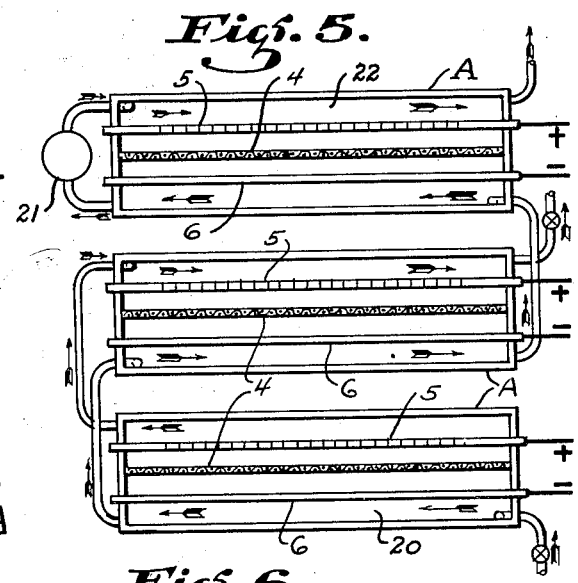
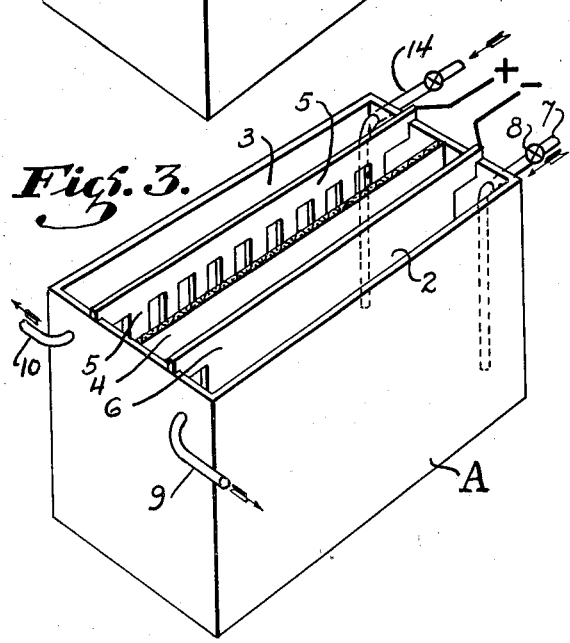
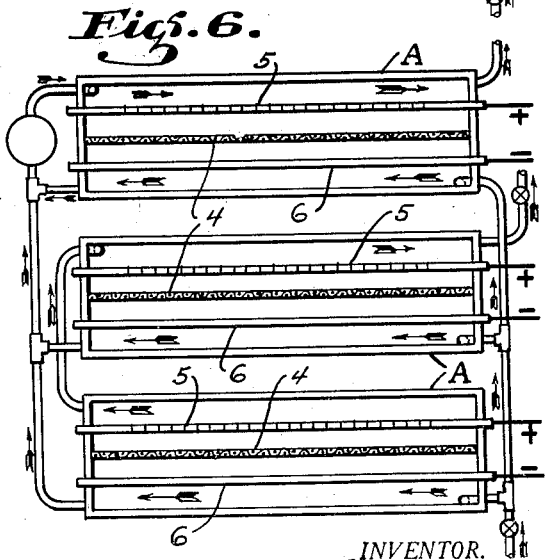
INVENTOR.
Robert E. Briggs.
BY
Chas. E. Townsend.
ATTORNEY.

Patented Feb. 8, 1944

2,341,356

UNITED STATES PATENT OFFICE 2,341,356

METHOD OF ELECTROLYTIC PRECIPITATION OF DISSOLVED SUBSTANCES FROM SOLUTIONS

Robert E. Briggs, Spreckels, Calif.

Application May 24, 1940, Serial No. 336,982

6 Claims. (Cl. 204—151)

This invention relates to a method which employs an electrolytic diaphragm cell to bring about precipitation of undesirable or contaminating ingredients found in solutions involved in industrial and domestic usage, by the simple expedient of increasing the pH (alkalinity) of said solutions to the optimum point at which precipitation occurs. The invention pertains particularly to the precipitation of definitely undesirable constituents found in waters commonly known as "hard" waters. The precipitation and removal of these "hardness" materials electrolytically, and without resorting to the use of chemicals, produces a soft water which more nearly approaches natural soft water than that produced by any other means within a competitive cost range.

The invention also presents an improvement in cell design or arrangement which brings into prominence the important feature of balancing anodic and cathodic influence in such a way that the pH of a solution which has been alkalized to the point of precipitation and subsequent removal of undesirable ingredients may be neutralized or adjusted to the pH value deemed desirable for usage.

Different types of electrolytic cells are employed, depending upon the result desired. These cells are shown by way of illustration in the accompanying drawing, in which Fig. 1 is a perspective diagrammatic view showing one form of cell;

Figs. 2 and 3 are diagrammatic views showing modifications thereof;

Fig. 4 is a diagrammatic plan view of an electrolytic cell in which both the cathode and a portion of the anode compartments are employed;

Fig. 5 is a diagrammatic plan view showing electrolytic cells arranged in series; and Fig. 6 is a similar view showing a plurality of electrolytic cells arranged in parallel.

It has been found that, in general, elements classed as inorganic are precipitated as salts by this electrolytic method in alkaline solution. In conjunction, a class of colloids and suspensoids carrying positive charges which may be present in the water or in water solutions are coagulated and occluded or brought down with the hardness precipitate. Inorganic precipitation (involving removal of calcium and magnesium compounds principally) occurs at about 10.5 pH and colloidal coagulation within approximately the same range. Negatively charged colloidal materials are neutralized in the anode chamber if the solution under treatment is subjected to that influence.

The electrolytic cell has been presented to industry in a number of forms and for numerous uses, but the applications have been restricted to purification of solutions by electrophoresis (electro-endosmosis, cataphoresis or ion migration). This invention takes advantage of electro-chemical activity at the electrodes when the solutions under treatment are directly in contact with said electrodes.

The softening of hard water by precipitation of the alkaline earth compounds (calcium and magnesium compounds) and other minor metallic compounds may be used to demonstrate the practical application of the process. A simple electrolytic cell of two compartments, separated by a diaphragm of porous material such as heavy canvas, and supplied with carbon or carbonaceous anodes and iron, brass or similar cathodes, may be used to exemplify the pH change and the accompanying precipitation. The raw (hard) water, normally of approximately 7.0 to 7.8 pH, is introduced into the cathode chamber of the cell where, under the influence of a direct electric current, it becomes alkaline. This alkalizing is accomplished through the reduction of the acid ions in the solution, following the theory of electrolysis, in which hydrogen ions are neutralized and evolved, thus tending to permit domination of hydroxyl or alkaline constituents through natural residence or influx from the anode chamber. The calcium, magnesium, iron and similar compounds being insoluble in alkaline solution under the herein described conditions, are precipitated or thrown out of solution. The sodium and potassium compounds do not precipitate and tend to fortify the alkalinity of the solution by the formation of the corresponding hydroxides. For most waters, complete precipitation may be accomplished at about 10.5 pH, but a different value may be found advantageous with waters which have a deficiency or superfluity of the sodium and potassium balance. The precipitate may be removed by either filtration or decantation; the clear liquor will be found to be soft with reference to soap hardness, and in conjunction the solids in solution for the treated water will be found materially reduced.

It has been pointed out that the inorganic precipitation accompanying water-softening by the electrolytic method is accomplished in the cathode chamber of the diaphragm cell. However, anodic influence play an important part in the economic utilization of electrical energy and in the bringing about of a balance which will provide a soft water at an alkalinity or pH value which is acceptable for usage.

It is obvious from the foregoing description that the raw water might be electrolized in the cathode chamber, a precipitate formed and removed from the solution by filtration or decantation, and the clear liquor (soft) then treated in the anode chamber to reduce its alkalinity. However, it has been found that in the case of continuous, or intermittent, flow involving all the water treated, the water in the anode compartment would have a much lower pH value than would be considered advisable for most usage. It has therefore been necessary to devise a balance of anodic and cathodic half-cells to obtain this proper and desirable pH. In view of the fact that usage determines the point of adjustment for the pH value of the finished treated solution, examples will be described to demonstrate some applications of the process.

A simple form of electrolytic water softening is presented in the treatment of hard waters for feed or make-up water for a steam generating boiler. It has been found desirable to maintain a pH of about 10.0 to 10.5 in most boilers during operation to safeguard against corrosion and to fortify against possible acidification due to destruction of organic contaminants which may inadvertently find their way into the feed lines. This value will be recognized as the point at which electrolytic precipitation occurs. It follows that the water treated in the cathode compartment needs only to be filtered to make it available for use as boiler feed water. The water may be treated while cold, if desired, but greater electrical efficiency will be obtained when the treatment is applied to hot raw water. It should be mentioned that pH values for hot and cold solutions are at variance for critical precipitation points, and that methods of measuring pH do not all agree precisely. For that reason it should be noted that the alkalinity in the cathode chamber is carried to the point at which precipitation occurs, or to give the desired softening effect. The point may be recognized and controlled by colorimetric or by electrometric measurement of pH, or by subjecting the alkalized water to the soap test for hardness. In the absence of all possibility of acidifying contaminants reaching the boilers, it may be deemed advisable to maintain a pH for the feed water below that attained during elimination of the hardness constituents. In such a case, the desired pH drop can be obtained by subjecting the clear soft water from the cathode chamber to anodic influence, a method which will be described later under domestic usage.

Three types of cells for applying the electrolytic water softening to boiler feed treatment will be described.

By referring to Fig. 1, it will be noted that an electrolytic cell is shown, generally indicated at A. The cell is divided into two compartments 2 and 3, by means of a porous diaphragm 4 which may be made of a heavy canvas, filter cloth, or other porous material. In the anode compartment is mounted a metallic electrode composed of iron, brass, or the like, such as indicated at 5, and in the cathode compartment is mounted a carbon electrode 6. The raw water to be treated is introduced to the cathode compartment through a pipe 7. A valve 8 is mounted therein, and the flow is regulated so that the pH of the water while flowing through the cathode compartment is raised to approximately 10.5. At this point precipitation of alkaline earths and hardness substances takes place. The outflow from the cathode compartment takes place through a pipe 9, and this is directed to a settling tank or filter 30 to remove the precipitates. From there the clear softened water may progress directly to a boiler. Seepage through the diaphragm 4 supplies the anode compartment, and a slight overflow is maintained through a pipe 10. The quantity of overflow water may vary from 1% to 5% of the total water treated.

In Fig. 2, the raw water is introduced directly into the anode compartment through a pipe 11, the cathode compartment having previously been filled. The influence of the electrolytic current (D. C.) causes the water level to rise in the cathode compartment. When a pH of 10.5 for the water in the cathode compartment is reached, a difference of level is obtained and a discharge outlet 12 for the softened water is located at that point. The size of the cathode chamber influences this level difference.

The inlet water valve, indicated at 11a, is adjustable to give capacity flow for the unit in service. An overflow outlet for the anode compartment, similar to that shown in Fig. 1, is advantageous. The outflow from the cathode chamber is decanted or filtered in the same manner as shown in Fig. 1.

The cell shown in Fig. 3 is substantially identical to that shown in Fig. 1, the only difference being that an inlet pipe 14 is connected with the anode compartment so that raw water or a portion of softened water may be admitted thereto. Otherwise, this cell operates substantially the same as that shown in Fig. 1.

In the method described for boiler feed water treatment, the outflow from the cathode chamber is filtered to remove the precipitate and is then used directly in the boiler at the alkalinity required for the precipitation of the "hardness" ingredients. This highly alkaline water, while considered acceptable for many boilers, must be subjected to further electrolytic treatment to reduce the pH if it is to meet the demands of certain uses. For example, water softened for domestic use (city, factory, home or laundry) should have an alkalinity of approximately 8.0 pH. To reduce the pH to the desired point requires treatment in the anode compartment of the electrolytic cell after the hardness materials have been removed. As previously stated, the pH reduction back to that of the original solution is not directly compensating; i. e., more electrical energy is required for the alkalizing than is required for acidification of the solution, which has been materially reduced in its buffer properties by the precipitation and removal of the salts of calcium, magnesium, iron, etc.

The processing of the water for domestic usage will serve to demonstrate the versatility of pH control within limits of desirability.

The electrolytic cell required for the treatment is shown in Fig. 4 and is similar to the cell shown in Fig. 1, which was used in connection with the treatment of boiler feed water, but differs therefrom in that it has a partition wall placed in the anode chamber which divides the anode chamber into two compartments 15 and 16. The raw or hard water enters the cathode chamber at 17, where it is alkalized to the precipitation point of approximately 10.5 pH. It then passes through a filter 18 for removal of the precipitates.

The clear soft water from the filter, still with a pH of approximately 10.5, is then caused to flow through the short section 15 of the anode chamber, where the pH is reduced to approximately 8.0. The separating wall 19 in the anode chamber is adjustable for distance from the inlet end, so as to give the amount of reduction in alkalinity desired. The greater this distance, the greater the anode contact area, and consequently the greater the drop in pH. For instance, if the soft water were allowed to flow the full length of the anode chamber, that is, by removal of the partition 19, the pH of the outflow would be approximately 5.0.

An assembly of smaller cells may be used to obtain the balance of anode and cathode contact area, with the solution under treatment, which will give the desired pH drop. These cells may be connected in series or in parallel with reference to the cathode chamber, but preference is given to the series hook-up shown in Fig. 5.

The raw water enters a cathode chamber 20 and progresses through the others of like polarity until the hardness precipitation point is reached. Filtration through the filter 21 removes the precipitate, and the clear water is caused to flow through the anode compartment 22 of the last cell in the series. The pH drop in the last anode chamber is controlled by assembling two, three or more cells and allowing the softened water to flow through one anode chamber only.

The electrical energy required for water softening will vary depending principally upon the amount of hardness to be removed. In general, from one to three kilowatt hours will be required per 1000 gallons of water softened. A current density of 1.5 to 2 amperes per square foot of electrode area may be maintained, but lower current density is to be preferred where the output demand for the soft water is low and comparatively large electrode area is not objectionable. The electrode area is designed to give an E. M. F. of 6 to 15 volts for economic operation.

Electrolytic precipitation of hardness materials from water offers the advantage of a reduction in dissolved solids of from 25% to 50%. Iron and similar metals which are regarded as particularly detrimental in water used in the textile industry are precipitated and removed. The liberation of oxygen at the anode and hydrogen at the cathode has a sterilizing effect on polution organisms which, when combined with the entrapping effect of precipitation, adds materially to purification of the water. The treated water can be maintained at any desired pH value from highly alkaline to highly acid as usage may demand. The softening unit requires only minor attention for operation on either continuous flow or for periodic deliveries.

While certain features of my invention have been more or less specifically described and illustrated, I nevertheless wish it understood that changes may be resorted to within the scope of the appended claims.

Having thus described and illustrated my invention, what I claim and desire to secure by Letters Patent is:

1. The method of electrolytically softening hard water in an electrolytic diaphragm cell having anode and cathode compartments comprising maintaining a flow of said water through the cathode compartment so that the pH of the water is raised to a point where at least a substantial proportion of the hardness-producing constituents is precipitated, removing the precipitate from the alkaline water, and passing the softened water through a portion only of the anode compartment of the cell to reduce the pH of the softened water.

2. The method of electrolytically softening hard water in an electrolytic diaphragm cell having anode and cathode compartments comprising maintaining a flow of said water through the cathode compartment so that the pH of the water is raised to a point where at least a substantial proportion of the hardness-producing constituents is precipitated, removing the precipitate from the alkaline water, and then passing the softened water through a portion only of the anode compartment of the cell to reduce the alkalinity of the water to a pH of substantially 8.0.

3. The method of electrolytically softening hard water in an electrolytic diaphragm cell having anode and cathode compartments comprising maintaining a flow of said water through the cathode compartment so that the pH of the water is raised to a point where at least a substantial proportion of the hardness-producing constituents is precipitated, removing the precipitate from the alkaline water, and then passing the softened water through a portion only of the anode compartment of the cell to reduce the alkalinity of the water to neutrality.

4. The method of electrolytically softening hard water in an electrolytic diaphragm cell having anode and cathode compartments comprising maintaining a flow of said water through the cathode compartment so that the pH of the water is raised to substantially 10.5 to thereby precipitate the hardness-producing constituents present in said water, removing the precipitate from the softened water, and then passing the softened water through a portion only of the anode compartment of the cell to reduce the alkalinity of the water.

5. The method of electrolytically softening hard water in an electrolytic diaphragm cell having anode and cathode compartments comprising maintaining a flow of said water through the cathode compartment so that the pH of the water is raised to substantially 10.5 to thereby precipitate the hardness-producing constituents present in said water, removing the precipitate from the softened water, and then passing the softened water through a portion only of the anode compartment of the cell to reduce the alkalinity of the softened water to a pH of substantially 8.

6. The method of electrolytically softening hard water in an electrolytic diaphragm cell having anode and cathode compartments comprising maintaining a flow of said water through the cathode compartment so that the pH of the water is raised to substantially 10.5 to thereby precipitate the hardness-producing constituents present in said water, removing the precipitate from the softened water, and then passing the softened water through a portion only of the anode compartment of the cell to reduce the alkalinity of the water to neutrality.

ROBERT E. BRIGGS.